United States Patent [19]

Dinnerstein

[11] 3,893,421

[45] July 8, 1975

[54] AQUARIUM AND METHOD OF FORMING THE SAME

[75] Inventor: Albert J. Dinnerstein, Brooklyn, N.Y.

[73] Assignee: Metaframe Corporation, Elmwood Park, N.J.

[22] Filed: June 25, 1973

[21] Appl. No.: 373,249

Related U.S. Application Data

[63] Continuation-in-part of Ser. No. 307,540, Nov. 17, 1972, abandoned.

[52] U.S. Cl. ................................................ 119/5
[51] Int. Cl.² ........................................ A01K 64/00
[58] Field of Search ............ 119/5; 260/27, 27 EV; 220/81 R, 82, 84

[56] References Cited
UNITED STATES PATENTS

| | | | |
|---|---|---|---|
| 2,975,150 | 3/1961 | Johnson et al. | 260/27 |
| 3,095,853 | 7/1963 | Stout | 119/5 |
| 3,167,051 | 1/1965 | Hovlid | 119/5 |
| 3,691,120 | 9/1972 | Susuki et al. | 260/27 EV |
| 3,759,224 | 9/1973 | Hall | 119/5 |

*Primary Examiner*—Hugh R. Chamblee
*Attorney, Agent, or Firm*—Max E. Shirk

[57] ABSTRACT

An aquarium is provided with identical rectangular top and bottom frame members inverted one with respect to the other. Each of the frame members is made from a molded thermoplastic material. Each frame member is provided with peripheral grooves which receive upper and lower horizontal edge portions of glass panels which are positioned in end-to-end relation to form an enclosure enclosed about the lateral sides thereof. A horizontal bottom panel is supported on a projecting portion extending about the periphery of the bottom frame member. Thermoplastic adhesive is provided within grooves of the upper and lower frame members, the thermoplastic adhesive being interposed between at least one of the inner surfaces of the grooves and at least one of the outer surfaces of the respective portions of the glass panels received within the grooves. In this manner, the thermoplastic adhesive fills at least portions of the grooves and at least partially contacts corresponding glass panels positioned therein. The corners formed between adjacent vertical panels, as well as the corners formed between the vertical panels and the bottom panel, are sealed with a room temperature vulcanizing silicone compound. The thermoplastic adhesive provides a relatively rigid bond between the glass panels and the frame members while the silicone compound provide a seal between the glass panels for containing liquid placed in the aquarium. A method of forming the aquarium is also described.

5 Claims, 7 Drawing Figures

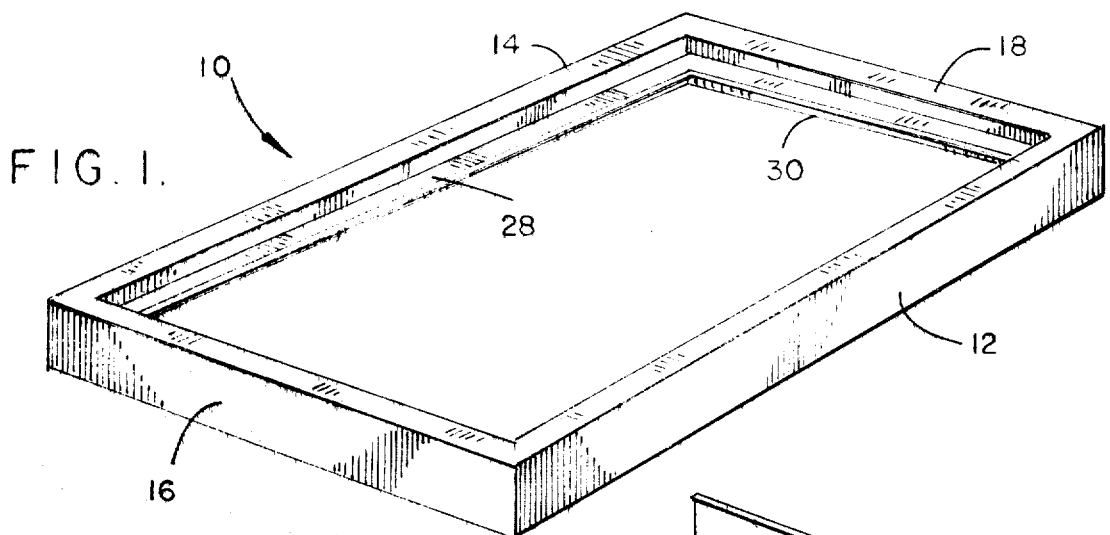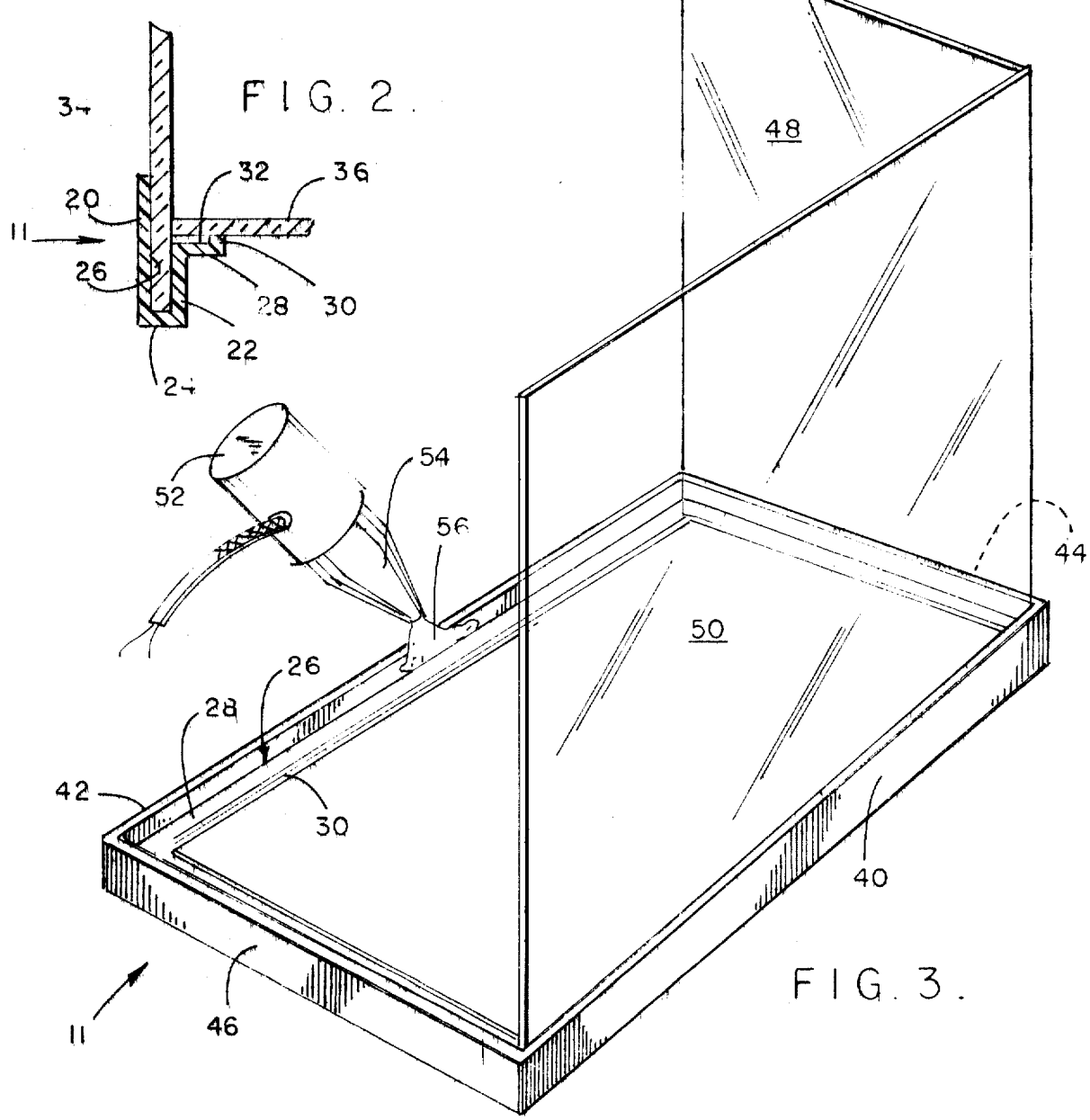

AQUARIUM AND METHOD OF FORMING THE SAME

CROSS-REFERENCES TO RELATED APPLICATIONS

This application is a continuation-in-part application of application Ser. No. 307,540, filed Nov. 17, 1972, now abandoned.

BACKGROUND OF THE INVENTION

The present invention generally relates to aquariums, and more particularly to an aquarium having upper and lower molded thermoplastic frame members and glass panels extending therebetween rigidly fixed to the frame members by a thermoplastic adhesive and the corners formed by the glass panels being sealed with a room temperature vulcanizing silicone compound for containing liquid placed in the aquarium.

The tendency in the mass production of aquariums is to utilize the simplest possible constructions and the fewest number of elements or components consistent with reliability and strength. Rapid and efficient assembly of aquariums is an important consideration. The aquarium described in the above referenced U.S. application Ser. No. 307,540, represents an aquarium design which is suitable for rapid and efficient assembly. Additionally, the aquarium there described provides the requisite reliability and shock resistance required primarily during shipment.

However, in the manufacture of aquariums described in U.S. Pat. No. 3,738,319 and in the copending patent application U.S. Ser. No. 307,540, or comparable or similar constructions, two primary problems emerge. One problem is that of handling the freshly sealed aquarium while the sealant sets and cures. The second problem is that of firmly attaching the plastic frame members to the glass panels.

The aquarium constructions under discussion, as described in the above referenced patent and application, comprise grooved upper and lower frame members adapted to receive respective upper and lower horizontal edge portions within respective grooves. An air-curing silicone rubber is utilized as a sealant to waterproof the joints between the glass panels and as an adhesive to hold the glass panels together. Additionally, the silicone sealant is utilized as the adhesive to attach the glass panels to the plastic or metal frame elements.

Typically, the silicone compounds, such as room temperature vulcanizing silicone, are placed within the grooves of the frame members and the upper and lower horizontal edges of the glass panels are urged into the grooves during the initial assembly phase of the aquarium. With such insertion, the silicone compound forms a seal about the glass panel edge portions.

It is well known to those skilled in the art that room temperature vulcanizing silicone compounds of the type under discussion set very slowly and do not harden to provide rigid bonds between the glass panels and the frame members for at least an hour. On the other hand, thermoplastic or hot-melt adhesives are known to set and harden in, typically, 30 seconds.

The use of silicone rubber as a sealant has few disadvantages, if the glass panels are kept stationary relative to one another during the typical 4 hour to 40 hour period required for the silicone sealant to cure. Under these conditions, the resulting seal may be waterproof and long lasting. However, if the glass panels are displaced relative to each other before the sealant has cured, there is a high likelihood that the resulting seal will be imperfect and that the finished aquarium will leak.

The use of silicone rubber as an adhesive to attach the plastic frame to the glass tank produces an only marginal useful structure. Silicone rubber adheres very well to glass, but very poorly to the styrene plastic commonly used as the frame material under conditions of water immersion. The water migrates into the seal formed at the glass surface and causes the same to deteriorate.

The very long period of time required for the silicone compounds to harden has complicated the assembly and increased the assembly time of construction of aquariums, with attendant higher cost and less efficient operation.

SUMMARY OF THE INVENTION

Accordingly, it is an object of the present invention to provide an aquarium which overcomes the above described disadvantages associated with comparable prior art aquariums.

It is another object of the present invention to provide an aquarium as above described which is simple in construction and economical to manufacture.

It is still another object of the present invention to provide a glass aquarium having upper and lower grooved frame members, glass panels having horizontal edge portions received in the grooves of the frame members and quick setting thermoplastic adhesive to provide a rigid construction of said panels relative to said frame members to facilitate sealing of the aquarium.

It is yet another object of the present invention to provide an aquarium comprising upper and lower frame members and glass panels extending therebetween, the glass panels being rigidly fixed to the frame members by means of thermoplastic adhesive and the corner portions formed by adjacent panels being sealed by a room temperature vulcanizing silicone compound.

It is a further object of the present invention to provide a method of assembling an aquarium of the type above described.

In order to achieve the above objects, as well as others which will become apparent hereafter, an aquarium in accordance with the present invention comprises top and bottom frame members inverted one with respect to the other. A plurality of adjoining vertical panels are provided each having vertical ends and having upper and lower horizontal edge portions. Said panels are positioned in abutting relation to from an enclosure closed about the lateral sides thereof. Vertical ends of adjoining panels are disposed in proximity to one another to form corner portions. Said top and bottom frame members are provided with peripheral groove means for receiving respective upper and lower horizontal edge portions of said panels. At least said bottom frame member is provided with support means extending about said peripheral groove means. A horizontal bottom panel is supported on the support means of said bottom frame member. Said vertical panels are disposed about the periphery of said bottom panel to form corner portions therewith. Bonding means is provided within at least sections of said groove means of both said top and bottom frame members. Said bonding means is interposed between at least one inner surface of said groove means and at least one outer surface of each of said upper and lower horizontal edge portions respectively of said panels received within said groove means for rigidly maintaining said panels with respect to said frame members. In this manner, said bonding means fills at least portions of said groove means and at least contacts corresponding panel portions positioned therein. Sealing means is provided in said corner portions where adjoining vertical ends of adjacent panels meet as well as in the corner portions formed with said bottom panel. In this manner, said bonding means provides a rigid bond between said panels and said frame members, and said sealing means provides a seal between said panels for containing liquid placed in the aquarium.

In accordance with a presently preferred embodiment, said bonding means comprises a quick setting thermoplastic adhesive which sets in approximately 30 seconds, utilized in conjunction with molded top and bottom frame members, made of thermoplastic material, and glass panels. Advantageously, said frame members are made of high impact polystyrene. Said groove means of each of said frame members comprises a groove having an opening facing the other frame member. Each groove has a tapered transverse cross section with dimensions increasing in the directions of the respective openings.

Each of the glass panels defines two spaced parallel major surfaces. According to one construction, said bonding means is only disposed between one major surface of each of said panels and said frame members while according to another construction said bonding means is disposed between each of the major surfaces of each of said panels and said frame members. The thermoplastic adhesive forms a rigid bond between said glass panels and said molded frame members to provide a rigid construction therebetween. Said sealing means provides a seal in the corner portions formed by said panels. Said sealing means advantageously comprises a silicone compound such as room temperature vulcanizing silicone rubber.

Advantageously, said thermoplastic or hot melt adhesive is provided substantially along the entire length of said groove means of each of said top and bottom frame members. The thermoplastic adhesive is selected to exhibit a coefficient of adhesion to said frame members greater than said adhesive's coefficient of adhesion to said panels when said adhesive, said frame members and said panels are submerged in water for 48 hours.

The method of assembling an aquarium having upper and lower molded thermoplastic frame members in accordance with the present invention comprises the step of bonding upper and lower horizontal edge portions of a plurality of vertical glass panels to respective one of the upper and lower frame members to form an enclosure closed about the lateral sides thereof. The bonding step comprises the step of applying a quick setting thermoplastic adhesive at least between portions of the frame members and the glass panels. A horizontal bottom glass panel is disposed on the bottom frame member contiguously with the vertical glass panels. Adjacent vertical panels form corners at their junctures and each vertical panel forms a corner with the bottom glass panel. Sealing means is provided along the corners subsequent to the setting of the thermoplastiic adhesive. The sealing means, advantageously of the silicone rubber type, is permitted to set.

A presently preferred method of assembling an aquarium in accordance with the present invention comprises the step of placing a thermoplastic adhesive at least along sections of grooves formed in the lower frame member of the aquarium. The lower frame member is provided with support means extending about said grooves. The lower horizontal edge portions of a plurality of adjoining panels having vertical ends are positioned into said grooves to form an enclosure closed about the lateral sides thereof. The vertical ends of adjacent panels are disposed proximate to one another to form corner portions. Said panels are inserted into said grooves of said bottom frame members before the thermoplastic adhesive has set. In this manner, the thermoplasstic adhesive fills at least portions of said grooves and at least contacts corresponding panel portions therein. A horizontal bottom panel is positioned on said support means of said bottom frame member to form with each of said vertical panels a corner portion. Thermoplastic adhesive is placed in at least sections of grooves of an upper frame member identical to said lower frame member and the upper frame member is positioned in aligned and inverted position with respect to the lower frame member. The upper frame member is lowered to bring the upper horizontal portions of said panels within the grooves of said upper member. In this manner, said thermoplastic adhesive fills at least portions of said grooves of said upper frame member and at least contacts corresponding upper horizontal portions of said panels. The corner portions formed by joining vertical ends of adjoining panels are sealed as are the corner portions formed by said vertical panels and said bottom panel. Said sealing step is effected subsequent to the setting of the thermoplastic adhesive. In this manner, said thermoplastic adhesive provides rigid bond between said panels and said frame members to form a rigid aquarium structure to thereby facilitate sealing of the aquarium.

According to the presently preferred method, the hot melt adhesive is provided substantially along the entire length of said grooves of each of said upper and lower frame members.

Although the presently preferred methods have been broadly defined above, variations in the assembly of the various panels and frame members are possible, and all such variations are equally contemplated by the present invention.

BRIEF DESCRIPTION OF THE DRAWINGS

With the above and additional objects and advantages in view, as will hereinafter appear, this invention comprises the device, combinations and arrangements of parts hereinafter described and illustrated in the accompanying drawings of a preferred embodiment in which:

FIG. 1 is a perspective view of an upper frame member of an aquarium in accordance with the present invention;

FIG. 2 is a fragmented side elevational cross section of a base portion of the aquarium in accordance with the present invention, showing the manner in which a side glass panel and a bottom glass panel are supported by the lower frame member;

FIG. 3 is a perspective view of a lower frame member of an aquarium in accordance with the present invention, showing a side panel and a front panel mounted in peripheral grooves of the frame member and showing thermoplastic adhesive being dispensed into a section of the groove of the lower frame member;

DETAILED DESCRIPTION OF THE PREFERRED EMBODIMENTS

Figure 5:
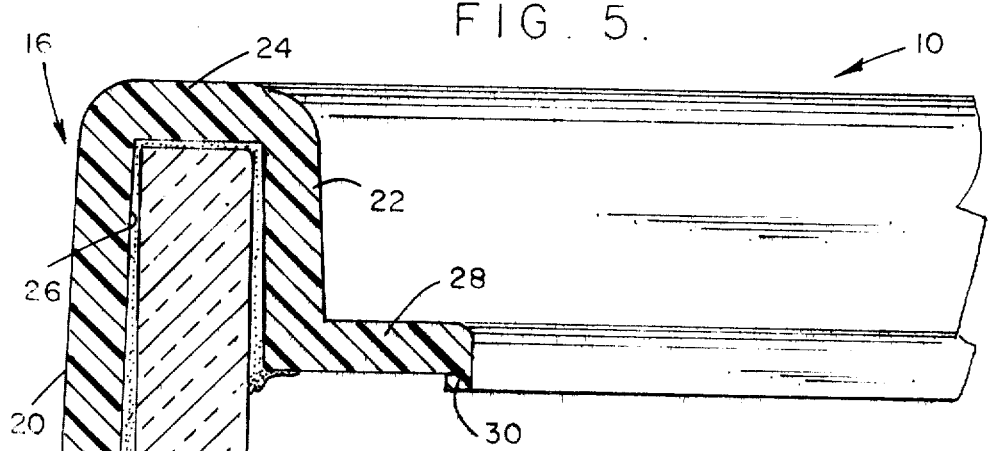
FIG. 5 is a fragmented side elevational cross section of a bottom portion of the aquarium of the present invention, showing the manner in which a side glass panel and a bottom glass panel are supported by the bottom frame member shown in FIG. 3, and further showing thermoplastic adhesive disposed between the inner surfaces of the groove and the outer surfaces of the glass panel received therein as well as showing silicone compound disposed in the corners formed by adjacent panels and between the bottom glass panels and an inward projection forming part of the bottom frame member.

Referring now specifically to the drawings, wherein the same reference numerals are utilized to designate identical or similar parts throughout, and first referring to FIG. 1, a top frame member of an aquarium in accordance with the present invention is generally designated by the reference numeral 10. It is pointed out that the top frame member 10, as well as the bottom frame member 11, is similar to that described in my above referenced application Ser. No. 307,540, wherein a specific description thereof is set forth.

According to the presently preferred embodiment, the top frame member 10 and the bottom frame member 11 are identical in construction. However, this is not a critical feature of the present invention and any grooved frame members may be utilized. In the assembled aquarium, the two frame members are vertically aligned one with the other and the upper frame member is inverted relative to the lower frame member.

The top frame member 10 includes a top front portion 12, a top rear portion 14 and top side portions 16 and 18.

Referring to FIG. 2, a cross section of the lower frame member 11, comparable to that of the frame member 10, is shown. The frame member generally includes an outer wall 20 and a spaced parallel inner wall 22. An end wall 24 is generally normal to and connects said outer and inner walls.

Figure 4:
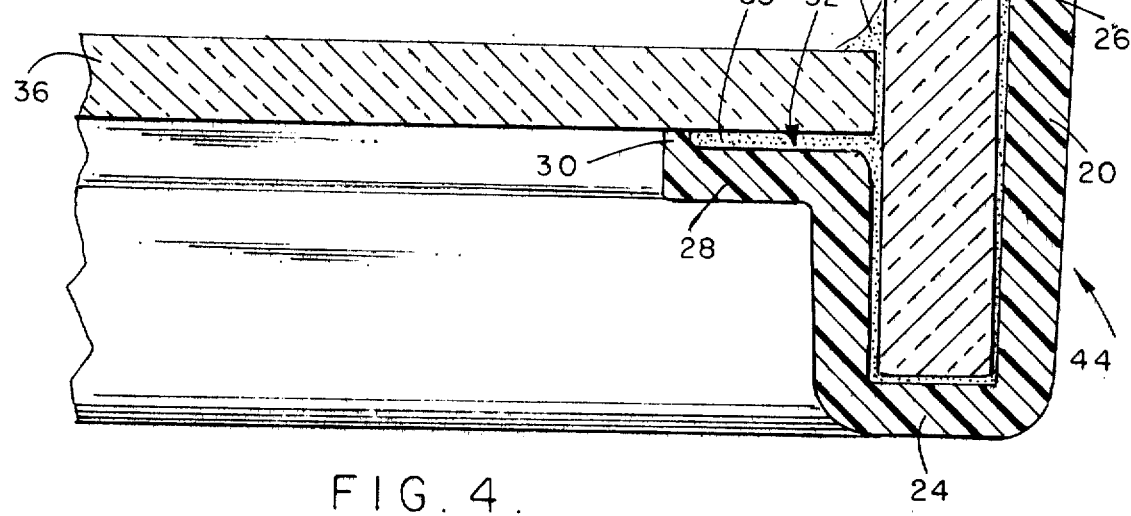
FIG. 4 is a fragmented side elevational cross section of a top portion of an aquarium in accordance with the present invention, showing the manner in which the top horizontal edge of a glass panel is received in the groove of the upper frame member shown in FIG. 1, and further showing the manner in which the thermoplastic adhesive is disposed in the groove.

The outer wall 20, the inner wall 22 and the end wall 24 together define a tapered groove or channel 26, to be more fully described hereafter and better illustrated in FIGS. 4 and 5.

An inward projection 28 projects from the free end of the inner wall 22 in a direction normal to the latter. A projecting lip 30 extends from the free end of the inward projection 28 in a direction away from the inner wall 22, as shown in FIG. 2. The inward projection 28 and the projecting lip 30 together define a space 32, to be more fully described.

A side glass more 34 defining two spaced parallel major surfaces is shown whose lower horizontal edge portion is received within the groove 26. Generally, the width of the groove 26 is selected to be greater than the thickness of the glass panel to thereby provide some clearance within the groove after the panel is received therein. The clearance in the groove is mor evident and more clearly depicted in FIGS. 4 and 5.

After the vertical panels have been positioned within the frame members, as to become more evident hereafter, a bottom glass panel 36 may be disposed in a horizontal position between the vertical glass panels to be supported by the projecting lip 30 extending about the periphery of the groove 26 of the lower frame member. The space 32 becomes more fully defined subsequent to the positioning of the glass panels as suggested in FIG. 2.

Referring to FIG. 3, an aquarium in accordance with the present invention is shown at an intermediate stage of construction. The bottom frame member 11 has a bottom front portion 40, a bottom rear portion 42 and bottom side portions 44 and 46.

A side vertical glass panel 48 is shown with its lower horizontal edge portion positioned within a corresponding section of the groove 26. Similarly, a front glass panel 50 is shown having its lower horizontal edge portion positioned within another section of the groove 26. According to the presently preferred embodiment, the frame members are rectangular and two pairs of opposite glass panels are provided. However, this construction is merely illustrative and frame members having any desired configurations and aquariums having any desired number of vertical glass panels may be utilized.

As suggested in FIG. 3, the panels are positioned in end-to-end relation to form an enclosure closed about the lateral sides thereof. The vertical ends of adjoining panels are disposed in proximity to one another to form corner portions.

An important feature of the present invention is the utilization of a two step assembly technique, wherein the glass panels are initially mated and assembled with the respective upper and lower frame members. During the first construction phase, a thermoplastic or hot melt adhesive dispenser 52, having a nozzle 54, dispenses hot melt adhesive interiorly of at least portions or sections of the grooves 26. This step is best illustrated in FIG. 3. Although the hot melt adhesive has been illustrated as being distributed within the groove 26 on both sides of the glass panels, this is not a critical feature of the present invention and, as will be more fully described hereafter, it is equally possible to apply the hot melt adhesive between one surface of the groove and a single opposed surface of a glass panel once the glass panel has been received within the groove.

Any quick setting thermoplastic resin adhesive may be utilized such as polyethylene, ethyl vinyl acetate or polyamede resins.

Although the hot melt adhesive 56 has been described as being dispensed along sections or portions of the grooves 26, the presently preferred embodiment contemplates the utilization of hot melt adhesive along the entire or substantial lengths of the groove.

The specific nature of the hot melt adhesive 56 is not critical for the purpose of the present invention. Any such adhesive may be utilized which forms a relatively rigid bond between the frame members and the glass panels. In accordance with the presently preferred embodiment, the frame members are advantageously made of molded thermoplastic material in the form of high impact polystyrene. Accordingly, the hot melt adhesive 56 is selected to provide a rigid bond, upon setting, between the glass panels and the polystyrene frame members 10 and 11. However, by the nature of the hot melt adhesive, the adhesive's coefficient of adhesion to the frame members is greater than the adhesive's coefficient of adhesion to the glass panels when the adhesive, the frame members and the glass panels are submerged in water for extended periods of time, such as more than 48 hours.

Referring to FIG. 4, it will be noted that the hot melt adhesive 56 is interposed between the inner surfaces of the groove 26 and the outer surfaces of the lower horizontal edge portions of the glass panel 48 received in the groove. In this manner, the hot melt adhesive 56 fills at least portions of the groove 26 and contacts corresponding panel portions positioned therein. The rapidly formed bond between the panels and the frame members facilitates the sealing of the aquarium, as will be described hereafter.

Still referring to FIG. 4, it will be noted that the hot melt adhesive 56 is distributed, by the insertion of the side glass panel 48 within the groove 26, to extend along the outer wall 20 and the inner wall 22. Clearly, the vertical glass panels are to be inserted into respective grooves prior to the setting of the hot melt adhesive.

To decrease the construction time for each unit, the hot melt adhesive 56 is advantageously selected to be quick setting. In this manner, the hot melt adhesive rigidifies or hardens within a very short time after the glass panels are positioned within the grooves. The resulting rigid bonds support the glass panels and prevent the latter from movement relative to the frame members. Herein, lies an advantage over the above described prior art constructions. The hardening of the hot melt adhesive after a short period of time eliminates the necessity of manually or otherwise securing the panels and frame members against movement during the subsequent assembly step or construction phase, namely the sealing operation. This permits, for example, assembly of the glass panels and frame members at one station and transmission of the semi-assembled units to a remote station for sealing the same. Once the hot melt adhesive has hardened, the assembled aquariums, although not sealed, can be safely and reliably transmitted to remote locations for further processing.

In FIG. 5, a top frame member 10 is shown mounted on a side glass panel 64, with the upper horizontal edge portion thereof within the groove or channel 26 of the top frame member. As with the lower frame member, the hot melt adhesive has been distributed, while still in a soft state, by the insertion of the glass panel within the groove. In both the upper and lower frame members, the hot melt adhesive is advantageously distributed over relatively large opposing surface areas of the frame members and glass panels to thereby increase the adhesion surfaces and the strength and rigidity of the resulting aquarium. The provision of hot melt adhesive along the entire length of the channels or grooves has the further advantage of preventing seapage or leakage of fluid in the region of the botton frame member 11 as well as preventing escape of liquid contained in the aquarium over the top horizontal edge portions of the vertical glass panels as a result of capillary action.

Figure 6:
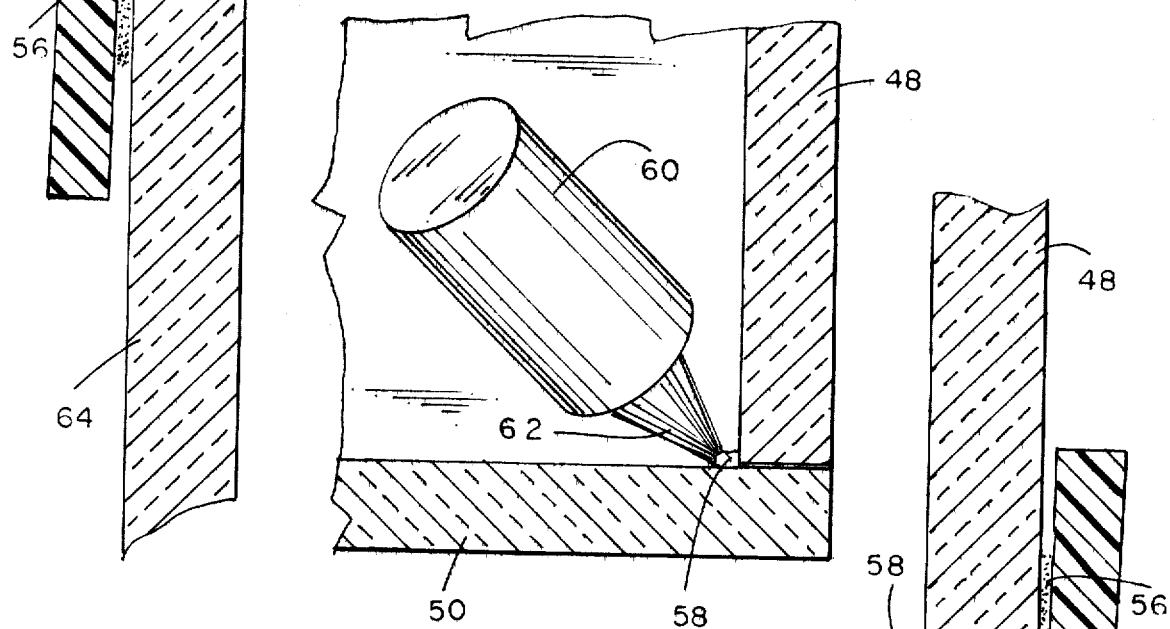
FIG. 6 is a fragmented top elevational cross section of two vertical glass panels together defining a corner and a dispenser for dispensing a sealer material in the corner as well as within the space or clearance which may be formed between the two glass panels.
Figure 7:
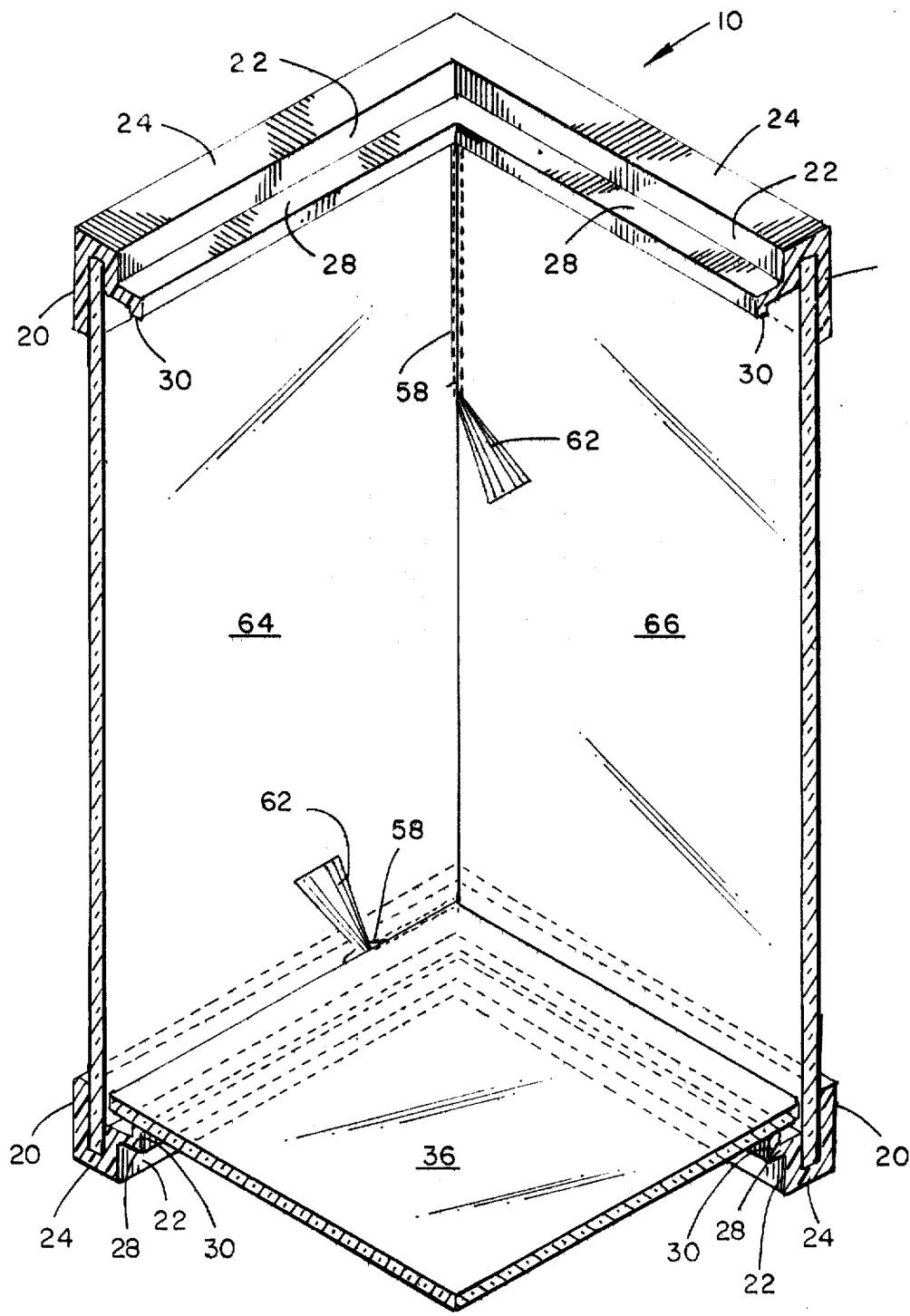
FIG. 7 is a cross sectional perspective view of a corner portion of the aquarium in accordance with the present invention, showing the bottom panel and two vertical panels supported by the upper and lower frame members, and further showing the manner in which sealer material may be dispensed in the corners formed by adjacent panels once the thermoplastic adhesive has hardened and has rigidified the aquarium structure to facilitate the sealing operation.

Referring to FIGS. 6 and 7, a dispenser 60 is illustrated having a nozzle 62 for dispensing a sealer material 58 along the corner portions formed by adjacent glass panels. Where the glass panels are imprecisely cut to form spaces or clearances therebetween, as suggested in FIG. 6, the sealer material may be dispensed to at least partially fill the spaces or clearances.

The sealer material is provided along the vertical corner portions formed by adjacent vertical panels. As illustrated in FIG. 7, sealer material is also provided along the corner portions formed by the vertical panels and the bottom horizontal panel 36. The sealer material 58, when applied to all the corner portions, provides a seal between the panels for containing liquid placed in the aquarium.

Referring to FIG. 4, it will be noted that the space 32 between the bottom panel 36 and the inward projection 28 is similarly filled by the sealer material 58. However, the space 32 may at least partially or fully be filled by the hot melt adhesive 56. In either case, it should be clear that the material provided within the space 32, particularly when the material is resilient, provides a shock absorber effect which helps the aquarium resist impacts without damage.

The sealer material may be of any conventional type currently used for this purpose. However, according to the presently preferred embodiment, the sealer material is a silicone compound, preferably of the room temperature vulcanizing type. Room temperature vulcanizing silicone compounds remain resilient and do not generally crack with continued use. Such silicone compounds assure a reliable seal over extended periods of time. An important feature of the present construction is that the aquarium no longer depends for its rigidity or structural strength upon the sealer material per se but, instead, now depends on the rapidly set hot melt adhesive disposed within the grooves of the frame members prior to the sealing operation. Contrary to such construction, many prior art aquariums have utilized the sealer material both for sealing as well as for maintaining the structural integrity of the aquarium.

Although one mode of assembly has been suggested above, there are several variations which may be utilized, with different degrees of advantage, each utilizing the basic principle of the invention. For example, it is possible to first partly fill the bottom frame member 11 groove 26 with thermoplastic or hot melt adhesive 56. The bottom frame member 11 may now be positioned on a surface as shown in FIG. 3. Four vertical glass panels are now inserted with their lower horizontal edge portions within the respective channer or groove sections of the bottom frame 11. The resulting distribution of the thermoplastic adhesive will be similar to that shown in FIG. 4. The top or upper frame member 10 is also, at this time, partly filled with thermoplastic adhesive within its groove 26. The top frame member 10 is pressed onto the glass panel assembly. A bottom glass panel 36 may now be positioned on the projecting lip 30 — the bottom panel adhering to the adhesive which has advantageously been squeezed out by insertion of the glass panels into the groove 26 of the bottom frame member 11. After the thermoplastic adhesive has set, silicone sealant may be applied to all the inside corners or inside junctions of the glass and bottom panels.

An alternate approach is the positioning of the bottom frame member 11 on a relatively horizontal surface. Four glass panels are positioned vertically wherein the lower horizontal edge portions thereof are received in the groove 26 of the lower or bottom frame member. Beads of thermoplastic adhesive are applied to the junctions or corners formed by the bottom frame member 11 and the individual vertical glass panels on the inside surfaces of the aquarium. A bottom panel may now be positioned on the upper projecting lip as described above. The bottom panel 36 will force adhesive into the voids or spaces between the glass panels and inner walls of the bottom frame member. The groove of the top frame member may be filled with the thermoplastic adhesive and the top frame member, aligned and inverted as described above, is lowered to receive the upper horizontal edge portions of the vertical panels. The silicone sealant may now be applied to all eight inside corners or junctions of the side and bottom glass panels as above.

A variation on both the latter two disclosed methods is the utilization or application of thermoplastic adhesive or hot melt adhesive to all eight inside junctions or corners of the vertical and bottom horizontal glass panels. The utilization of a hot melt adhesive, instead of a silicone adhesive after the aquarium has been assembled and rigidifed by any of the above discussed procedures, will produce a serviceable aquarium. However, the resulting aquarium will generally have a shorter service life than that provided by the utilization of silicone sealants. The shorter service life is to be anticipated based on the fact that current thermoplastic adhesives are inferior to silicone rubber when employed as a glass to glass sealant.

It will be noted that the above described assembly variations differ in the specific succession of mating or interconnection of the aquarium elements. However, all the preferred methods utilize thermoplastic or hot melt adhesives disposed between the frame members and the captured horizontal edge portions of the glass panels.

The present invention, therefore, tacks the frame members onto the glass panels as an aid in assembly and immobilizes the glass panels and the plastic frame members by means of a quick setting thermoplastic adhesive. The silicone sealant, applied to the junctions or corners of the glass panels, is not disturbed by movements of the panels during curing.

A valuable and additional benefit of the above structure is that common thermoplastic adhesives adhere to plastics better than they adhere to glass. Silicone rubber adheres better to the glass than to the plastic.

In the aquarium design of the present invention, the two larger surfaces of each glass panel are essentially coplanar. The groove 26 of each of the frame members into which the glass panels fit is wider at its open end than at its closed end. When one attempts to adhere the glass to the frame with silicone rubber, the adhesive mass which is securely bonded to the glass can be easily withdrawn from the plastic frame whose channel is, of necessity in ejection molded structures, tapered to permit easy withdrawal.

Replacing silicone with a thermoplastic adhesive in the above structure, the adhesive bonds to the frame strongly. Its lack of bond to the glass is not troublesome because the hardened adhesive forms a coplanar sided channel which matches the coplanar configuration of the glass panels. This structure retains the glass strongly by friction and by vacuum pressure.

Consequently, using thermoplastic or hot melt adhesives instead of silicone compounds for bonding frame members to glass panels serves a double purpose. It rapidly locks the glass panels in fixed positions so that the silicone sealants used to bond the glass panels together can cure undisturbed. It also, as a very significant side benefit, causes the frame members to adhere to the glass far better than can be achieved by use of silicone.

The above described construction incorporates the advantages of prior art constructions and advances the latter by simplifying the construction process and providing a more reliable aquarium construction.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. In the assembly of an aquarium having upper and lower molded, grooved thermoplastic frame members, the method comprising the steps of:
   disposing a thermoplastic adhesive within the grooves of at least a lower frame member, said adhesive being capable of setting in approximately 30 seconds;
   disposing the lower horizontal edge portions of a plurality of vertical glass panels within the grooves of said lower frame member before said adhesive sets, said vertical glass panels forming an enclosure closed about the lateral sides thereof;
   adjusting said vertical glass panels so that adjacent vertical panels form corners at their junctures;
   permitting said lower frame member and said adjusted vertical glass panels to remain undisturbed for approximately 30 seconds until said thermoplastic adhesive sets to thereby maintain said panels in their adjusted positions;
   disposing a horizontal bottom glass panel on the bottom frame member contiguously with said vertical glass panels, each of said vertical glass panels forming a corner with said bottom glass panel; and
   applying sealing means along all of said corners.

2. The method defined in claim 1, wherein the step of dispossing said bottom glass panel takes place subsequent to the setting of the thermoplastic adhesive but prior to the step of applying the sealing means.

3. The method defined in claim 1, wherein the thermoplastic material is applied substantially along the entire length of said frame members.

4. The method as defined in claim 1, wherein the step of disposing said bottom glass panel takes place prior to the setting of the thermoplastic adhesive.

5. The method as defined in claim 1, wherein the step of applying sealing means comprises the step of applying a silicone rubber compound.

* * * * *